(12) United States Patent
Delaplace et al.

(10) Patent No.: US 8,798,810 B2
(45) Date of Patent: Aug. 5, 2014

(54) ENERGY PROTECTING DEVICE FOR AIRCRAFT

(75) Inventors: Franck Delaplace, Toulouse (FR); Didier Ronceray, Pibrac (FR); Jean Muller, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 1472 days.

(21) Appl. No.: 12/066,599

(22) PCT Filed: Sep. 12, 2006

(86) PCT No.: PCT/FR2006/002082
§ 371 (c)(1),
(2), (4) Date: Mar. 12, 2008

(87) PCT Pub. No.: WO2007/031634
PCT Pub. Date: Mar. 22, 2007

(65) Prior Publication Data
US 2008/0208398 A1     Aug. 28, 2008

(30) Foreign Application Priority Data
Sep. 13, 2005   (FR) ...................................... 05 09324

(51) Int. Cl.
| | | |
|---|---|---|
| *G01C 23/00* | (2006.01) | |
| *B64D 31/08* | (2006.01) | |
| *B64D 31/06* | (2006.01) | |
| *B64D 31/10* | (2006.01) | |
| *G05D 1/00* | (2006.01) | |
| *B64D 27/02* | (2006.01) | |

(52) U.S. Cl.
CPC ................ *B64D 31/08* (2013.01); *B64D 31/06* (2013.01); *B64D 31/10* (2013.01); *B64D 27/02* (2013.01); *B64D 2700/62938* (2013.01); *G05D 1/0072* (2013.01)
USPC .................................. 701/3; 701/99; 701/29.2

(58) Field of Classification Search
CPC ........ B64C 17/00; B64D 27/02; B64D 27/06; B64D 27/08; B64D 27/12; B64D 27/14; B64D 27/18; B64D 27/20; B64D 27/26; B64D 31/00; B64D 31/02; B64D 31/04; B64D 31/06; B64D 31/08; B64D 31/10; B64D 31/12; B64D 31/14; B64D 2027/00; B64D 2027/02; B64D 2033/00; B64D 2205/00; B64D 2700/62938; B64D 2700/6299; F01D 21/00; F02D 25/00; F02D 25/02; F02D 25/04; F02D 37/00; G05D 1/0072
USPC ........................... 701/3, 15, 16, 99, 112, 29.2
See application file for complete search history.

(56) References Cited

U.S. PATENT DOCUMENTS

| | | | |
|---|---|---|---|
| 3,987,279 A | | 10/1976 | Borelan |
| 4,884,205 A | * | 11/1989 | Hernandez-Diaz ............. 701/99 |
| 5,374,010 A | * | 12/1994 | Stone et al. ................... 244/12.5 |
| 5,927,655 A | * | 7/1999 | Larramendy et al. ......... 244/195 |
| 6,880,784 B1 | * | 4/2005 | Wilkinson et al. .......... 244/76 R |
| 2005/0073440 A1 | | 4/2005 | Jourdan |

FOREIGN PATENT DOCUMENTS

| | | |
|---|---|---|
| FR | 2 308 975 | 11/1976 |
| FR | 2 753 171 | 3/1998 |
| FR | 2 860 081 | 3/2005 |

OTHER PUBLICATIONS

International Search Report dated Jan. 25, 2007 w/ English translation.
Written Opinion of the ISA w/ English translation.

* cited by examiner

*Primary Examiner* — Jerrah Edwards
(74) *Attorney, Agent, or Firm* — Dickinson Wright PLLC

(57) ABSTRACT

An energy protecting device for three and four-engined aircraft includes a detecting unit configured to detect failure of

Fig. 1 each engine. A control unit is configured to provide a protective function by controlling maximum thrust of each engine. A triggering unit is configured to monitor a plurality of parameters and trigger the control unit to provide maximum thrust at predetermined conditions of the monitored parameters. An inhibiting unit is linked to the triggering unit and is configured to inhibit the protective function, when at least one of the engine on the wings of the aircraft has failed. The control unit is also configured to control the engines that have not failed to minimize thrust imbalance.

17 Claims, 3 Drawing Sheets

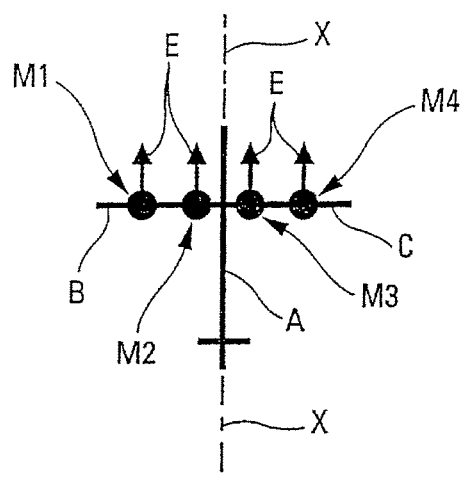
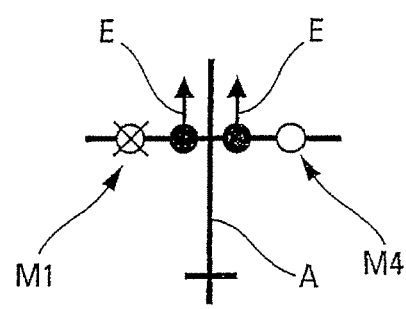
Fig. 2　　　　　　　　Fig. 3
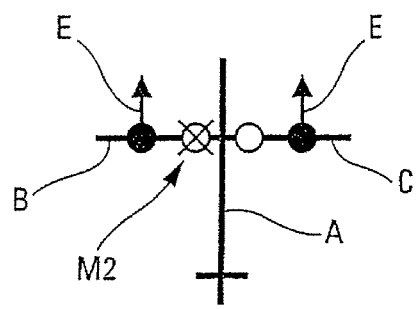
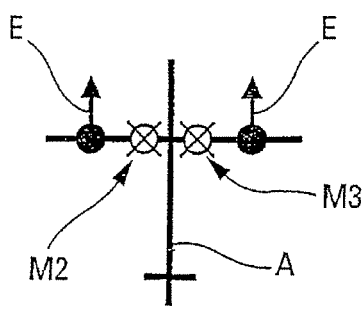
Fig. 4　　　　　　　　Fig. 5

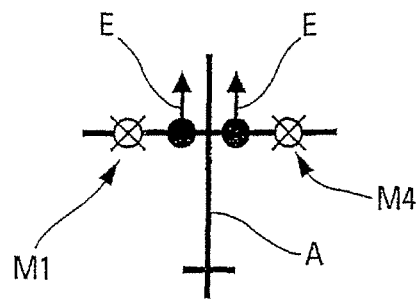
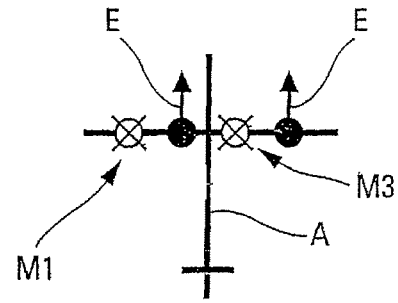
Fig. 6          Fig. 7
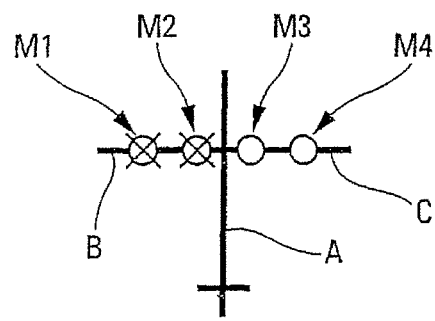
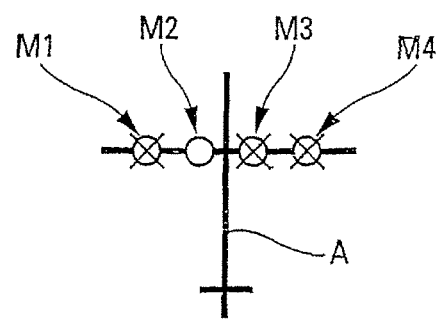
Fig. 8          Fig. 9

ENERGY PROTECTING DEVICE FOR AIRCRAFT

FIELD OF THE INVENTION

The present invention relates to an energy protecting device for an aircraft, in particular a four-engined aircraft.

BACKGROUND OF THE INVENTION

More precisely, said device is intended to protect the aircraft from low energy situations (low speed, high incidence, weak engine thrust) which can threaten the safety of the aircraft, particularly close to the ground.

In general, such a device usually comprises:
triggerable control means, for activating, when they are triggered, a protective function consisting in automatically controlling said engines in order that each of them provides maximum thrust; and
triggering means to automatically monitor a plurality of parameters and to automatically trigger said control means when triggering conditions depending on said parameters are fulfilled.

However, because of the generation of maximum thrust on each of the engines of the aircraft at the time of activation of the protective function, a problem arises in the event of a failure of one of these engines. In fact, in this case, said protective function causes a thrust unbalance, that is to say the thrust generated on one side (under one wing) of the aircraft is much greater than that generated on the other side (under the other wing). This gives rise to a large yaw movement which can result in difficult lateral control and therefore generate a large safely problem for the aircraft.

Also, in order to avoid such a situation, a protective device of said type generally furthermore comprises:
detecting means for detecting all of said engine failures; and
inhibiting means which are connected to said detecting means and which are able to inhibit said triggering means and therefore deactivate said protective function.

Said inhibiting means are usually produced in such a way as to inhibit the triggering means as soon as one of the engines is detected as having failed by said detecting means, which makes it possible to avoid the aforesaid problems.

However, such a solution greatly reduces the availability of the protective device such that, as soon as at least one engine fails, the aircraft no longer has energy protection.

SUMMARY OF THE INVENTION

The purpose of the present invention is to overcome these disadvantages. It relates to an energy protecting device for an aircraft which has at least one engine arranged on each of its wings and at least one additional engine, this device having an extended field of use in which the safety of the aircraft is maintained.

For this purpose, according to the invention, said device of the type comprising:
detecting means for detecting the failures of said engines;
triggerable control means, for activating, when they are triggered, a protective function consisting in automatically controlling said engines in order that they provide maximum thrust;
triggering means to automatically monitor a plurality of parameters and to automatically trigger said control means when triggering conditions depending on said monitored parameters are fulfilled; and
inhibiting means connected to said detecting means and able to act upon said triggering means in order to inhibit the activation of said protective function,
is noteworthy in that:
said inhibiting means are produced in such a way as to inhibit the activation of said protective function, solely when all of the engines which are arranged on a common wing of the aircraft have simultaneously failed; and
said control means are produced in such a way that, when they are triggered, they control, depending on the number and position of the possibly failed engines, at least some of the engines that have not failed, in such a way as to minimize a possible thrust unbalance with respect to the fuselage of the aircraft.

In a preferred embodiment, the device according to the invention is applied to an aircraft which is provided with four engines arranged in pairs on its wings. In this case, said inhibiting means are therefore produced in such a way as to inhibit the activation of said protective function, solely when two engines which are arranged on a common wing of the aircraft have simultaneously failed.

Thus, due to the invention, the energy protection function is inhibited solely if two engines situated on a common wing have simultaneously failed, such a situation then making the created unbalance critical for the lateral control of the aircraft, which makes it possible to reduce considerably the number of cases of inhibiting this protective function. Consequently, the protecting device according to the invention has a much wider field of use than a usual device of the aforesaid type, in particular in the case of the failure of a single engine or in the case of the failure of two engines which are arranged on different wings.

Moreover, due to the invention, the control means are produced in such a way as to minimize a possible thrust unbalance (with respect to the fuselage of the aircraft), as described below. Consequently, an activation of the protective function does not disturb the lateral control of the aircraft.

The aforesaid features therefore make it possible to increase the safety of the aircraft, both generally and with respect to a usual energy protecting device of the aforesaid type.

In a preferred embodiment, said control means are produced in such a way as to control (in order to obtain maximum thrust), when they are triggered:
when no engine has failed, all four engines;
when an outer engine has failed, solely the two inner engines on either side of the fuselage;
when an inner engine has failed, solely the two outer engines on either side of the fuselage;
when the two outer engines have failed, the two inner engines on either side of the fuselage;
when the two inner engines have failed, the two outer engines on either side of the fuselage; and
when the inner engine of a first wing and the outer engine of the second wing have failed, the two engines that have not failed.

The device according to the present invention can also be applied to a three-engined aircraft which is provided with one engine arranged on each of its wings and with an additional engine arranged on the fuselage. In this case, advantageously, said inhibiting means are produced such that they inhibit the activation of said protective function, solely when at least one of the engines which are arranged on the wings has failed.

Moreover, advantageously, said triggering means are associated with a plurality of sensors for measuring at least some of the following parameters: the incidence of the aircraft, the longitudinal attitude of the aircraft, the pitch speed of the aircraft, the speed of the aircraft and its deceleration rate, the Mach number of the aircraft, the position of the slats and flaps of the aircraft, the radio-altitude height of the aircraft (height with respect to the ground), the position of a joystick and engine parameters (engine speed) making it possible to detect an engine failure.

Said detecting means and the above sensors can be part of one and the same detection unit.

In a preferred embodiment, said triggering means take into account, as triggering conditions:
   first conditions relating to a triggering need; and
   second conditions relating to a triggering authorization,
which must be fulfilled simultaneously in order to generate the triggering.

In this case, advantageously, said first conditions are fulfilled if at least one of the following situations is verified:
   the incidence of the aircraft is greater than or equal to a first incidence value and a low energy condition has been active for a predetermined duration;
   the incidence of the aircraft is greater than or equal to a second predetermined incidence value;
   an incidence protecting means is engaged and a control member of the aircraft is in a position close to the nose-up stop;
   the attitude of the aircraft is greater than a predetermined attitude value and the control member is in a position close to the nose-up stop.

Moreover, advantageously, said second conditions are fulfilled if all of the following situations are verified simultaneously:
   the height of the aircraft with respect to the ground is greater than a predetermined height value at the time of the landing;
   the Mach number of the aircraft is less than a predetermined Mach number value; and
   a plurality of particular systems of the aircraft, such as an ADR ("Air Data Reference") unit, an IRS ("Inertial Reference System") system, a radio-altimeter, a means of determining the airspeed and a means of determining the angle of incidence are valid.

Moreover, the energy protecting device according to the invention furthermore comprises at least one means which is able to be operated by an operator and which is produced in such a way as to deactivate said protective function when it is operated. This means can in particular be a push-button, a control means associated with a screen, or a thrust control lever which can for example be placed in the idling position.

Moreover, advantageously, said control means are produced in such a way as to control, when the protective function is activated, at least some of the engines that have not failed such that the latter each provide maximum thrust for a takeoff (known as "Max Take-Off" thrust) or for a go-around.

BRIEF DESCRIPTION OF THE DRAWINGS

The figures of the appended drawing will give a good understanding of how the invention can be embodied. In these figures identical references indicate similar elements.

FIGS. 2 to 9 diagrammatically show an aircraft upon which are shown, as appropriate, the failed engines, the engines whose thrust is not modified and the engines whose thrust is modified according to the present invention.

DETAILED DESCRIPTION OF THE INVENTION

Figure 1:
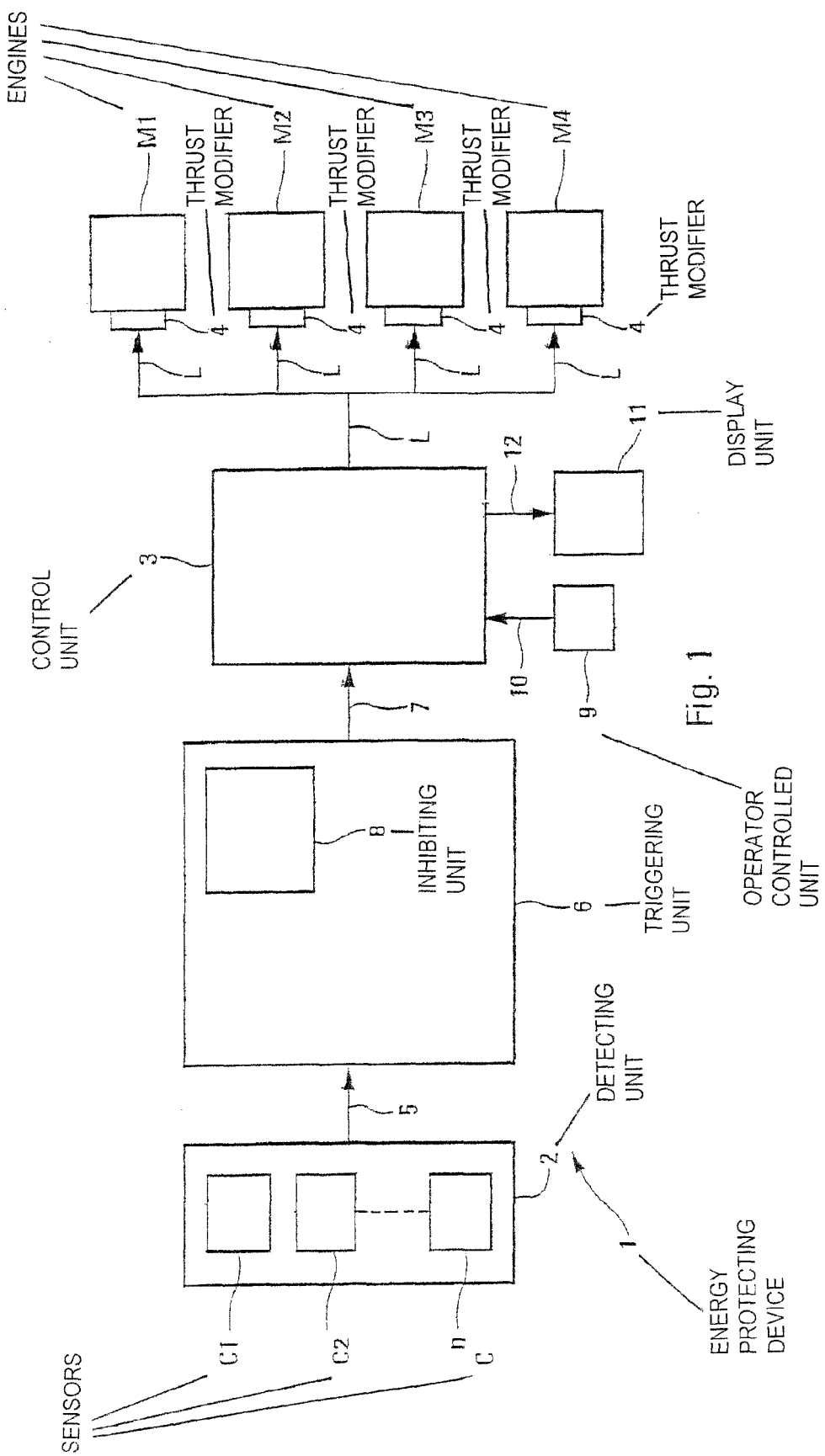
FIG. 1 is the block diagram of a device according to the invention.

The device 1 according to the invention and shown diagrammatically in FIG. 1 is an energy protecting device for an aircraft A fitted with four engines M1, M2, M3 and M4. More generally, the device 1 is intended to protect the aircraft A from low energy situations (low speed, high incidence, low engine thrust) which can place the safety of the aircraft A at risk, particularly close to the ground.

In order to do this, said device 1 is of the usual type comprising:
   detecting means forming part, for example, of a detection unit 2, for detecting all the failures of said engines M1, M2, M3 and M4;
   control means 3 which can be triggered and which are produced in such a way as to activate a protective function when they are triggered. This protective function consists in automatically controlling said engines M1, M2, M3 and M4 in such a way as to modify the thrust delivered in order that they each provide maximum thrust. In order to do this, said control means 3 are connected by the intermediary of links L to usual means 4 for modifying the thrust given by said engines M1, M2, M3 and M4, particularly by modifying the fuel supply of said engines;
   triggering means 6 which are connected by the intermediary of links 5 and 7 to said detection unit 2 and to said control means 3 respectively and which are produced in such a way as to monitor automatically a plurality of particular parameters (described below) and to trigger automatically said control means 3 when triggering conditions (described below) depending on said parameters are fulfilled; and
   inhibiting means 8 which are linked with said triggering means 6, for example by being integrated in the latter, and which are produced in such a way as to act on said triggering means 6 in order to inhibit the activation of said protective function.

If the protective function is not activated or if its activation has been inhibited, the various engines M1 to M4 of the aircraft A are of course controlled in the usual way according to usual commands generated in particular by the pilot of the aircraft A.

According to the invention, in particular in order to increase the field of use of the device 1, whilst maintaining the safety of the aircraft A:
   said inhibiting means 8 are produced in such a way as to inhibit the activation of said protective function (that is to say to prevent or to stop the use of this function), solely when two engines arranged on a common wing B or C of the aircraft A have simultaneously failed; and
   said control means 3 are produced in such a way that, when they are triggered by said triggering means 6, they control, depending on the number and position on the wings B and C of the engines which have possibly failed, at least certain of the engines which have not then failed in order to simultaneously:
      obtain maximum thrust; and
      minimize a possible thrust unbalance with respect to the fuselage of the aircraft A, illustrated by an axis X-X in FIG. 2.

Thus, due to the invention, the protective function is inhibited solely if two engines situated on a common wing B or C of the aircraft A have simultaneously failed, such a situation making the reduction of a possible thrust unbalance impossible. The preceding feature makes it possible to reduce considerably the number of cases of inhibition of this protective function. Consequently, the protecting device 1 according to the invention has a much wider field of use than does a usual device. It is, in particular, active in the event of a failure of a single engine or in the event of a failure of two engines which are arranged on different wings of the aircraft A.

Moreover, due to the invention, the control means 3 are produced in such a way as to minimize a possible thrust unbalance [with respect to the fuselage (X-X) of the aircraft A], as described below. Consequently, an activation of the protective function does not disturb the lateral control of the aircraft A.

The aforesaid features therefore make it possible to increase the safety of the aircraft A, both in a general manner and in comparison with a usual energy protecting device.

In a particular embodiment, said detection unit 2 comprises a plurality of sensors C1, C2, . . . , Cn for respectively measuring at least some of the following parameters (which are monitored by the triggering means 6): the incidence of the aircraft A, the longitudinal attitude of the aircraft A, the pitch speed of the aircraft A, the speed of the aircraft A and its deceleration rate, the Mach number of the aircraft A, the position of the slats and flaps of the aircraft A, the radio-altitude height of the aircraft A (height with respect to the ground), the position of a joystick, and engine parameters (engine speed) making it possible to detect an engine failure.

Moreover, said triggering means 6 take into account, as triggering conditions:

first conditions relating to a need to trigger the protective function, which are based on parameters representing the actions of the pilot and the situation of the aircraft A; and second conditions relating to an authorization to trigger the protective function, which are based on parameters of the aircraft A and of systems of said aircraft A.

These first and second conditions must be fulfilled simultaneously in order to cause the triggering of the control means 3.

In a particular embodiment, said first conditions are fulfilled if at least one of the following situations A/, B/, C/ and D/ are fulfilled:

A/ the incidence of the aircraft A is greater than or equal to a first incidence value and a low energy condition has been active for a predetermined duration;

B/ the incidence of the aircraft A is greater than or equal to a second predetermined incidence value;

C/ an incidence protecting means is engaged and the control member is in a position close to the nose-up stop;

D/ the attitude of the aircraft A is greater than a predetermined attitude value and the control member is in a position close to the nose-up stop.

With regard to said situation A/, it will be noted that:

the incidence of the aircraft A corresponds to the sum of an aircraft incidence aavion and a dynamic value ad. This dynamic value ad is a phase lead term which takes account of the deceleration of the aircraft A, of high wind conditions or of pitch speed conditions of the aircraft A, and thus anticipates a short-term increase in the angle of incidence;

said first incidence value is determined as a compromise between the maneuverability constraints of the aircraft A and the effectiveness of the protective function. This first incidence value depends for example on the positions of the slats and flaps of the aircraft A and on the Mach number;

said predetermined duration represents a delay which allows the pilot to have sufficient time to react (starting from a first detection of a low energy condition which can for example be solely acoustic without effect on the speed of the engines) before the triggering of the protective function, which can be considered by the pilot negatively since it often results in a go-around.

With regard to the situation B/, said second incidence value corresponds to an incidence considered as maximal, again giving an acceptable margin with respect to the stalling incidence of the aircraft A. This second incidence value is higher than said first incidence value and can be determined, for example, as a function of the position of the slats and of the flaps as well as of the Mach number of the aircraft A.

Moreover, said second conditions are fulfilled if all of the situations E/, F/ and G/ are fulfilled simultaneously:

E/ the height of the aircraft A with respect to the ground is greater than a predetermined height value, at the time of the landing;

F/ the Mach number of the aircraft A is less than a predetermined Mach number value; and G/ a plurality of particular systems, such as an ADR ("Air Data Reference") unit, an IRS ("Inertial Reference System") system, a radio-altimeter, a means of determining airspeed, and a means of determining the angle of incidence of the aircraft A are valid.

It will be noted that because of the condition relating to said situation E/, the protective function is inhibited on the ground, and even during the landing, if the aircraft A is situated too close to the ground.

Moreover, the device 1 according to the invention furthermore comprises at least one means 9 which is connected for example by the intermediary of a link 10 to said control means 3 (or to said triggering means 6), which can be operated by an operator and which is produced in such a way as to deactivate said protective function when it is operated. Thus the pilot is able at any time to deactivate said protective function. By way of illustration, said means 9 can be:

a push-button;

a control means which is associated with a screen, for example a screen of the FCU ("Flight Control Unit") type;

a thrust control lever, which can for example be set to idling in order to deactivate the protective function.

Said device 1 can also comprise a display means 11 which is connected by the intermediary of a link 12 to said control means 3 and which is able to display a message warning a pilot of the aircraft A of any activation of the protective function, for example by displaying an appropriate message on a screen, such as a PDF ("Primary Flight Display") screen for example.

Moreover, said control means 3 are produced in such a way as to control, when the protective function is activated, at least some of the engines of the aircraft A that have not failed such that the latter each provide the usual maximum thrust for a takeoff or a go-around.

As mentioned previously, the protective function is triggered each time that said appropriate conditions are fulfilled. Moreover, this protective function is inhibited solely if two engines which are situated on a common wing B or C of the aircraft A have simultaneously failed.

FIGS. 2 to 9 are diagrammatic representations of different possible situations which each time show the aircraft A having wings B and C. Each wing B, C comprises an outer engine M1, M4 with respect to the fuselage (X-X) of the aircraft A and an inner engine M2, M3 with respect to said fuselage. In these FIGS. 2 to 9, said engines M1, M4 are shown in the form:

of a circle with a cross, when the corresponding engine has failed, as shown for example for the engine M1 in FIG. 3;

of a blackened circle, when the corresponding engine is controlled at maximum power according to the present invention. Such a control is represented by the intermediary of arrows E which illustrate the corresponding thrust (or traction), as shown for example for the engines M2 and M3 in FIG. 3; and a simple non-blackened circle, when the corresponding engine has not failed but is controlled according to the invention such that it continues to generate power which is representative of normal commands, as shown for example for the engine M4 in FIG. 3.

According to the invention, said control means 3 are produced in such a way as to control, in order to obtain maximum thrust, when they are triggered:

when no engine has failed, all four engines M1 to M4, as shown in FIG. 2;

when one outer engine M1 has failed, solely the two inner engines M2 and M3 on either side of the fuselage (X-X) of the aircraft A, as shown in FIG. 3;

when one inner engine M2 has failed, solely the two outer engines M1 and M4 on either side of the fuselage, as shown in FIG. 4;

when the two inner engines M2 and M3 have failed, the two outer engines M1 and M4 on either side of the fuselage, as shown in FIG. 5;

when the two outer engines M1 and M4 have failed, the two inner engines M2 and M3 on either side of the fuselage, as shown in FIG. 6; and when the inner engine M3 on a first wing C and the outer engine M1 on the second wing B have failed, the two engines M2 and M4 that have not failed.

In brief, when the conditions relating to the triggering of the protective function are fulfilled and:

if no engine has failed, all of the engines are controlled at maximum thrust, as shown in FIG. 2. Symmetrical thrust is obtained in this way;

if two engines have failed but are not on a common wing B, C, the remaining two engines are controlled at maximum thrust, as shown in FIG. 7. This can result in a slight thrust unbalance; and if two engines on a common wing have failed, the protective function is inhibited. This is the case when solely two engines M1 and M2 have failed, as shown in FIG. 8, or when three engines M1, M3 and M4 have failed, as shown in FIG. 9.

The question does not of course arise in the case of a simultaneous failure of all four engines M1 to M4.

It will be noted that the energy protecting device according to the invention can also apply to a three-engined aircraft (not shown) comprising two under-wing engines and one engine on the fuselage. If the engine on the fuselage fails, provision is made for activating the energy protecting function on the two under-wing engines. In order to do this, the means of inhibiting said energy protecting device are produced in such a way as to inhibit the activation of said protective function solely when at least one of the under-wing engines has failed.

The invention claimed is:

1. An energy protecting device for an aircraft having a fuselage and a wing on each side of the fuselage, with four engines arranged in pairs on each wing, said device comprising:

a detecting unit configured to detect failure of each engine;
a control unit configured to provide a protective function by controlling maximum thrust of each engine;
a triggering unit configured to monitor a plurality of parameters and trigger said control unit to provide maximum thrust at predetermined conditions of said monitored parameters; and
an inhibiting unit linked to said triggering unit and configured to inhibit activation of said protective function, when the two engines arranged on a common wing of the aircraft have failed,
wherein said control unit is further configured to control the two engines that have not failed to minimize thrust imbalance of the aircraft fuselage upon triggering by the triggering unit.

2. The device as claimed in claim 1, wherein said control unit, upon triggering, is further configured to control:

when no engine has failed, all four engines;
when an outer engine has failed, two inner engines on either side of the fuselage;
when an inner engine has failed, two outer engines on either side of the fuselage;
when two outer engines have failed, two inner engines on either side of the fuselage;
when two inner engines have failed, two outer engines on either side of the fuselage; and
when an inner engine of a first wing and an outer engine of a second wing have failed, two engines that have not failed.

3. An energy protecting device for a three-engined aircraft having a fuselage and provided with one engine arranged on each wing and an additional engine arranged on the fuselage, said device comprising:

a detecting unit configured to detect failure of each engine;
a control unit configured to provide a protective function by controlling maximum thrust of each engine;
a triggering unit configured to monitor a plurality of parameters and trigger said control unit to provide maximum thrust at predetermined conditions of said monitored parameters; and
an inhibiting unit linked to said triggering unit and configured to inhibit said protective function, when at least one of the engines which is arranged on the wings has failed,
wherein said control unit is further configured to control the engines that have not failed to minimize thrust imbalance of the aircraft fuselage upon triggering by the triggering unit.

4. The device as claimed in claim 1, wherein said triggering unit is configured with a plurality of sensors to measure at least one of the following parameters: the incidence of the aircraft, the longitudinal attitude of the aircraft, the pitch speed of the aircraft, the speed of the aircraft and its deceleration rate, the Mach number of the aircraft, the position of the slats and flaps of the aircraft, the radio-altitude height of the aircraft, the position of a joystick and engine parameters to detect an engine failure.

5. The device as claimed in claim 1, wherein said triggering unit is further configured to trigger said control unit under the following simultaneous conditions:

first conditions relating to a triggering need; and
second conditions relating to a triggering authorization.

6. The device as claimed in claim 5, wherein said first conditions are fulfilled according to at least one of the following conditions:

the incidence of the aircraft is greater than or equal to a first incidence value and a low energy condition has been active for a predetermined duration;
the incidence of the aircraft is greater than or equal to a second predetermined incidence value;

an incidence protecting means is engaged and a control member of the aircraft is in a position close to the nose-up stop;

the attitude of the aircraft is greater than a predetermined attitude value and the control member is in a position close to the nose-up stop.

7. The device as claimed in claim 5, wherein said second conditions are fulfilled according to the following simultaneously verified conditions:

the height of the aircraft with respect to the ground is greater than a predetermined height value at the time of the landing;

the Mach number of the aircraft is less than a predetermined Mach number value; and a plurality of particular systems of the aircraft are valid.

8. The device as claimed in claim 1, further comprising at least one operator unit configured to deactivate said protective function by an operator.

9. The device as claimed in claim 1, wherein said triggering unit is further configured to control, upon triggering, at least one of the engines that have not failed to provide maximum thrust for a takeoff or for a go-around.

10. An aircraft comprising a device as claimed in claim 1.

11. The device as claimed in claim 3, wherein said triggering unit is configured with a plurality of sensors to measure at least one of the following parameters: the incidence of the aircraft, the longitudinal attitude of the aircraft, the pitch speed of the aircraft, the speed of the aircraft and its deceleration rate, the Mach number of the aircraft, the position of the slats and flaps of the aircraft, the radio-altitude height of the aircraft, the position of a joystick and engine parameters to detect an engine failure.

12. The device as claimed in claim 3, wherein said triggering unit is further configured to trigger said control unit under the following simultaneous conditions:

first conditions relating to a triggering need; and
second conditions relating to a triggering authorization.

13. The device as claimed in claim 12, wherein said first conditions are fulfilled according to at least one of the following conditions:

the incidence of the aircraft is greater than or equal to a first incidence value and a low energy condition has been active for a predetermined duration;

the incidence of the aircraft is greater than or equal to a second predetermined incidence value;

an incidence protecting means is engaged and a control member of the aircraft is in a position close to the nose-up stop;

the attitude of the aircraft is greater than a predetermined attitude value and the control member is in a position close to the nose-up stop.

14. The device as claimed in claim 12, wherein said second conditions are fulfilled according to the following simultaneously verified conditions:

the height of the aircraft with respect to the ground is greater than a predetermined height value at the time of the landing;

the Mach number of the aircraft is less than a predetermined Mach number value; and a plurality of particular systems of the aircraft are valid.

15. The device as claimed in claim 3, further comprising at least one operator unit configured to deactivate said protective function by an operator.

16. The device as claimed in claim 3, wherein said triggering unit is further configured to control, upon triggering, at least one of the engines that have not failed to provide maximum thrust for a takeoff or for a go-around.

17. An aircraft comprising a device as claimed in claim 3.

* * * * *